(12) United States Patent
Aota

(10) Patent No.: US 10,616,508 B2
(45) Date of Patent: Apr. 7, 2020

(54) SOLID STATE IMAGING SENSOR, OBSERVATION APPARATUS USING SOLID STATE IMAGE SENSOR, METHOD FOR DRIVING IMAGE PICKUP SECTION, AND RECORDING MEDIUM FOR RECORDING PROGRAM FOR DRIVING IMAGE PICKUP SECTION

(71) Applicant: Olympus Corporation, Hachioji-shi, Tokyo (JP)

(72) Inventor: Koji Aota, Machida (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/992,142

(22) Filed: May 29, 2018

(65) Prior Publication Data

US 2018/0359433 A1    Dec. 13, 2018

(30) Foreign Application Priority Data

Jun. 9, 2017   (JP) ................................ 2017-114268

(51) Int. Cl.
| | | |
|---|---|---|
| *H04N 5/335* | (2011.01) | |
| *H04N 5/232* | (2006.01) | |
| *G02B 27/09* | (2006.01) | |
| *H04N 5/235* | (2006.01) | |
| *H04N 5/353* | (2011.01) | |
| *H04N 5/369* | (2011.01) | |

(52) U.S. Cl.
CPC ......... *H04N 5/335* (2013.01); *G02B 27/0955* (2013.01); *H04N 5/2353* (2013.01); *H04N 5/23212* (2013.01); *H04N 5/23229* (2013.01); *H04N 5/232121* (2018.08); *H04N 5/3535* (2013.01); *H04N 5/36965* (2018.08); *H04N 5/2354* (2013.01)

(58) Field of Classification Search
CPC .. H04N 5/335; H04N 5/2354; H04N 5/36965; H04N 5/3535; H04N 5/2353; H04N 5/23229; H04N 5/23212; G02B 27/0955
See application file for complete search history.

(56) References Cited

U.S. PATENT DOCUMENTS

| | | | | |
|---|---|---|---|---|
| 2013/0234029 A1* | 9/2013 | Bikumandla | ......... | H01L 25/043 250/349 |
| 2016/0133659 A1* | 5/2016 | Chao | ..................... | H04N 5/379 257/231 |
| 2017/0359539 A1* | 12/2017 | Kawabata | .......... | H04N 5/35554 |

(Continued)

FOREIGN PATENT DOCUMENTS

JP    2016-052054    4/2016

*Primary Examiner* — Jason A Flohre
(74) *Attorney, Agent, or Firm* — John C. Pokotylo; Pokotylo Patent Services

(57) ABSTRACT

A solid state image sensor includes light receiving sections formed in a two-dimensional array, in which the light receiving section in one unit is formed such that a lens provided on a light receiving surface, a first light receiving element configured to receive light incident from an object via the lens, and a second light receiving element provided in a layer below the first light receiving element and configured to receive light incident from the object via the lens and the first light receiving element and acquire information about a distance to the object configure a stacked structure.

10 Claims, 13 Drawing Sheets

(56) References Cited

U.S. PATENT DOCUMENTS

2018/0191879 A1* 7/2018 Evans V ............... H04N 5/2226
2018/0213205 A1* 7/2018 Oh ....................... H04N 5/3592
2018/0292206 A1* 10/2018 Ohki .................. H04N 5/37452

* cited by examiner

SOLID STATE IMAGING SENSOR, OBSERVATION APPARATUS USING SOLID STATE IMAGE SENSOR, METHOD FOR DRIVING IMAGE PICKUP SECTION, AND RECORDING MEDIUM FOR RECORDING PROGRAM FOR DRIVING IMAGE PICKUP SECTION

CROSS REFERENCE TO RELATED APPLICATION

This application claims the benefit of Japanese Application No. 2017-114268 filed in Japan on Jun. 9, 2017, the contents of which are incorporated herein by this reference.

BACKGROUND OF THE INVENTION

1. Field of the Invention

The present invention relates to a solid state image sensor applied in an observation apparatus which observes a desired object, the observation apparatus using the solid state image sensor, a method for driving an image pickup section, and a recording medium for recording a program for driving the image pickup section.

2. Description of Related Art

Conventionally, as an observation apparatus which observes a desired object using an image pickup unit including, for example, an image pickup optical system and a solid state image sensor, observation apparatuses in various forms have been put to practical use. For example, in recent years, an observation apparatus or the like which observes a sample such as a cell within an incubator by transmission illumination using an image pickup unit has been proposed, and has been put to practical use.

The conventional observation apparatus of the type has been configured to have a function of optionally enlarging and observing a desired site of a sample (an observation object) such as a cell within an incubator in addition to having a function of automatically scanning the entire sample (observation object), for example.

When a desired observation object is observed using the conventional observation apparatus, the image pickup unit forms an optical image of the observation object using the image pickup optical system and forms the optical image on an image forming surface of the solid state image sensor, and the solid state image sensor performs photoelectric conversion processing, to generate image data of the observation object.

In the image pickup unit in the conventional observation apparatus, an automatic focus adjustment operation (hereinafter referred to as an AF operation) is performed when the optical image of the observation object is formed. As the AF operation, an AF operation using a so-called contrast detection method for detecting a maximum contrast of an image based on the image data acquired by the solid state image sensor while moving the image pickup optical system in a direction along an optical axis to detect an in-focus state has been generally adopted, for example.

However, the above-described AF operation using the contrast detection method has problems that it takes time to perform the AF operation although a highly-precise focusing result can be obtained. For example, when the entire observation object is scanned and picked up, an entire area to be scanned and picked up is divided into areas, and an AF operation and an image pickup operation are repeated for each of the areas. Therefore, in some cases it takes a huge amount of time until the AF operation and the image pickup operation for the entire observation object are completed.

On the other hand, as the recent observation apparatuses, various observation apparatuses have been proposed, the observation apparatuses being adapted to be able to simultaneously acquire, as information that can be acquired using a solid state image sensor included in the image pickup unit, not only general normal color image information but also image information of special light observation (e.g., fluorescence observation or infrared light observation), distance information (distance data) to a desired observation object, and the like.

For example, an observation apparatus adapted to acquire distance data, for example, by adopting a solid state image sensor in a form described below as the solid state image sensor included in the image pickup unit in the observation apparatus is proposed in, for example, Japanese Patent Application Laid-Open Publication No. 2016-52054.

The above-described observation apparatus disclosed in, for example, Japanese Patent Application Laid-Open Publication No. 2016-52054 adopts a solid state image sensor in such a form as to arrange a light receiving element capable of focus detection using a phase difference detection method or a pupil division method in a substantially entire region excluding some of a plurality of light receiving elements in a two-dimensional array within a light receiving surface in a solid state image sensor while arranging a TOF (time of flight) range image sensor (a device capable of directly acquiring distance data) in a partial region.

SUMMARY OF THE INVENTION

A solid state image sensor according to an aspect of the present invention includes light receiving sections formed in a two-dimensional array, wherein each of the light receiving sections including a lens provided on a light receiving surface, a first light receiving element configured to receive light incident from an object via the lens, and a second light receiving element provided in a layer below the first light receiving element and configured to receive light incident from the object via the lens and the first light receiving element and acquire information about a distance to the object, the lens, the first light receiving element, and the second light receiving element configuring a stacked structure.

An observation apparatus according to another aspect of the present invention includes an image pickup unit comprising: a solid state image sensor including light receiving sections formed in a two-dimensional array, each of the light receiving sections including a lens provided on a light receiving surface, a first light receiving element configured to receive light incident from an object via the lens, and a second light receiving element provided in a layer below the first light receiving element and configured to receive light incident from the object via the lens and the first light receiving element and acquire information about a distance to the object, the lens, the first light receiving element, and the second light receiving element configuring a stacked structure; and an image pickup optical system configured to form an optical image of an observation object on the light receiving surface in the solid state image sensor; an illumination unit configured to irradiate the observation object with illumination light; a display unit configured to display an image of the observation object based on an image signal acquired by the image pickup unit; and a control unit including a control section configured to perform driving control of the image pickup unit, the illumination unit, and the display unit.

A method for driving an image pickup section according to still another aspect of the present invention is a method for driving an image pickup section including a solid state image sensor including light receiving sections, each of which is formed such that a lens, a first light receiving element, and a second light receiving element configure a stacked structure, formed in a two-dimensional array, a first illumination section, and a second illumination section, the method including finishing signal reading processing of the first light receiving element, and then performing signal reading processing of the second light receiving element.

A recording medium for recording a program for driving an image pickup section according to a further aspect of the present invention is a recording medium for recording a program for driving an image pickup section including a solid state image sensor including light receiving sections, each of which is formed such that a lens, a first light receiving element, and a second light receiving element configure a stacked structure, formed in a two-dimensional array, a first illumination section, and a second illumination section, the recording medium causing a computer to perform a procedure for generating a vertical synchronization signal, a procedure for starting driving control of the first light receiving element and the first illumination section in synchronization with the vertical synchronization signal, a procedure for stopping driving the first light receiving element and the first illumination section after an elapse of a predetermined time period from start of the driving control of the first light receiving element and the first illumination section, a procedure for starting driving control of the second light receiving element and the second illumination section after stopping driving the first light receiving element and the first illumination section, and a procedure for stopping driving the second light receiving element and the second illumination section after an elapse of a predetermined time period from the start of the driving control of the second light receiving element and the second illumination section.

Advantages of the present invention will become further apparent from the following detailed description.

DETAILED DESCRIPTION OF THE PREFERRED EMBODIMENT

The present invention will be described below according to an illustrated embodiment. Each of the drawings used for the following description is a schematic representation. To respectively represent components with sizes sufficient to be recognizable on the drawings, a dimensional relationship among members, respective scales of the members, and the like may be made to differ for each of the components. Therefore, the present invention is not limited only to illustrated forms for the number of components described in each of the drawings, respective shapes of the components, a ratio of respective sizes of the components, a relative positional relationship among the components, and the like.

First Embodiment

An embodiment of the present invention illustrates an observation apparatus which observes a sample such as a cell within an incubator by transmission illumination using an image pickup unit including an image pickup optical system and a solid state image sensor, for example.

Note that although an illumination unit configured to observe an observation object by transmission illumination is illustrated as an example in the observation apparatus according to the present embodiment, a form of the illumination unit is not limited to the form (transmission illumination). As an illumination unit in another form, an illumination unit in such a form as to illuminate an observation object by reflection illumination, for example, may be applied.

Figure 1:
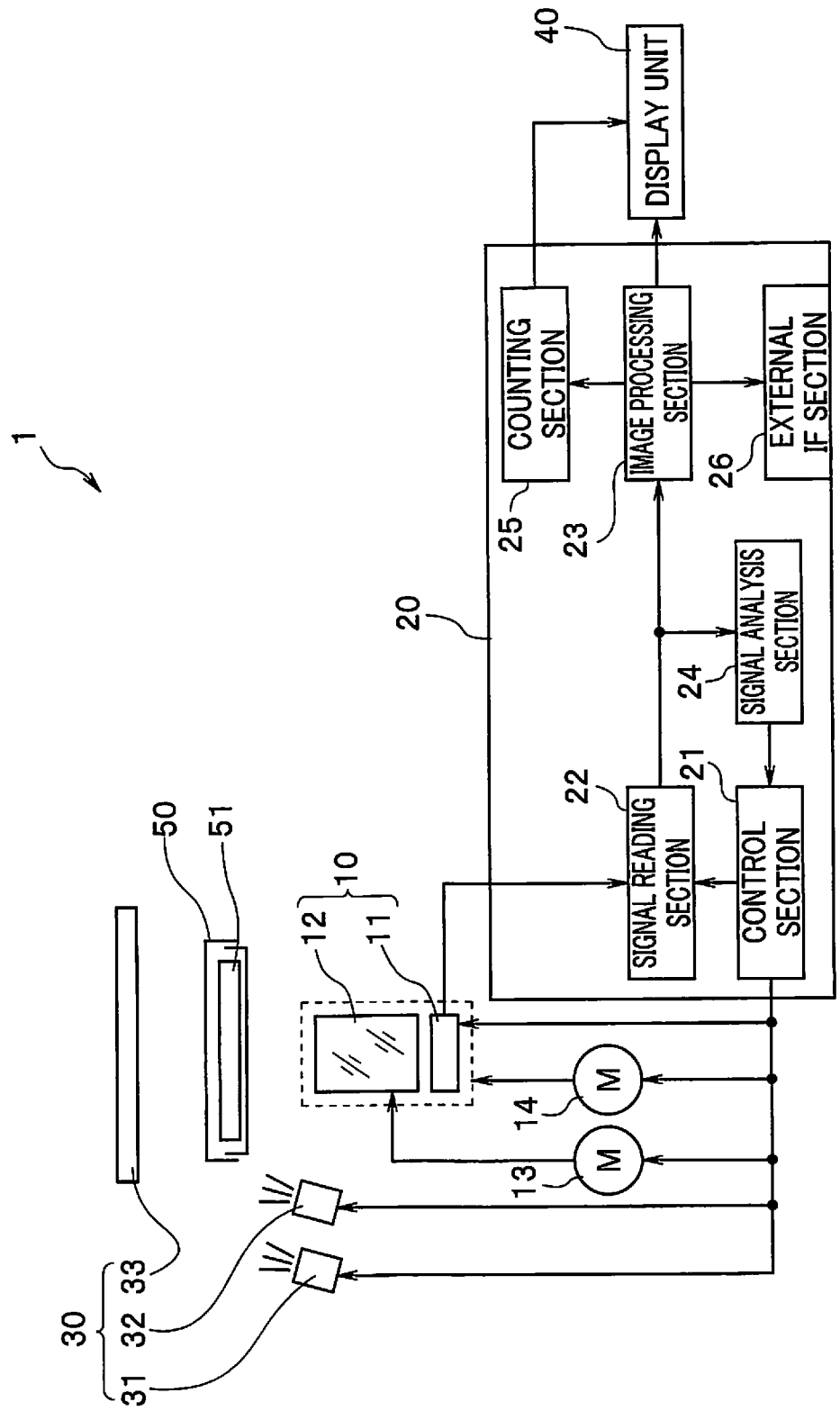
FIG. 1 is a block configuration diagram illustrating a schematic configuration of an observation apparatus using a solid state image sensor according to one embodiment of the present invention.

First, a schematic configuration of the observation apparatus using the solid state image sensor according to the present invention will be described below with reference to FIG. 1 before a detailed configuration of the solid state image sensor according to the present invention is described. FIG. 1 is a block configuration diagram illustrating a schematic configuration of an observation apparatus using a solid state image sensor according to one embodiment of the present invention.

As illustrated in FIG. 1, an observation apparatus 1 using a solid state image sensor 11 according to the present embodiment is mainly configured by, for example, a driving unit including an image pickup unit 10, a control unit 20, an illumination unit 30, a display unit 40, and an incubator 50.

The image pickup unit 10 is a constituent unit configured to convert an optical image of an observation object to be observed into an electric signal and output image data. The image pickup unit 10 is mainly configured by, for example, the solid state image sensor 11, an image pickup optical system 12, a lens driving section 13, and an image pickup unit driving section 14.

The solid state image sensor 11 is a photoelectric conversion element configured to receive the optical image of the observation object and convert the optical image into an electric signal, generate an image signal based on the observation object, and at the same time acquire various types of information such as distance information (distance data) to the observation object. Note that the solid state image sensor 11 is a principal part of the present invention, and a detailed configuration of the solid state image sensor will be described below.

The image pickup optical system 12 is a constituent unit configured by, for example, a plurality of optical lenses and a lens barrel configured to hold the plurality of optical lenses and configured to form an optical image of an observation object. The optical image of the observation object formed by the image pickup optical system 12 is formed on a predetermined image forming surface of the solid state image sensor 11.

The lens driving section 13 is a constituent unit including, for example, a driving mechanism and a driving source for driving the image pickup optical system 12. For example, the lens driving section 13 performs a focus adjustment operation by moving the image pickup optical system 12 back and forth in a direction along the optical axis thereof. The focus adjustment operation to be performed is controlled by a control section 21 in the control unit 20, described below, based on the information outputted from the solid state image sensor 11, for example.

The image pickup unit driving section 14 is a constituent unit including, for example, a driving mechanism and a driving source for moving the image pickup unit 10 within a predetermined plane with respect to the observation object. Driving control of the image pickup unit driving section 14 is performed by the control section 21 in the control unit 20. Note that the image pickup unit driving section 14 is a section not directly associated with the present invention, and hence a detailed configuration of the image pickup unit driving section is omitted.

The control unit 20 is a constituent unit configured to integrally control the respective constituent units in the observation apparatus 1. The control unit 20 is mainly configured by, for example, the control section 21, a signal reading section 22, an image processing section 23, a signal analysis section 24, a counting section 25, and an external interface section (external IF section) 26.

The control section 21 is a control circuit configured to control each of the constituent units in the observation apparatus 1.

The signal reading section 22 is a circuit section configured to perform signal reading processing for reading out an output signal (an electric signal obtained by photoelectric conversion) from the solid state image sensor 11 in the image pickup unit 10. The signal read out by the signal reading section 22 is outputted to the image processing section 23 and the signal analysis section 24, and is subjected to predetermined signal processing in each of the sections.

The image processing section 23 is a circuit section configured to perform various types of image signal processing, for example, processing for generating counting processing image data in addition to display image data and recording image data in response to the output signal from the signal reading section 22. The image data generated by the image processing section 23 is outputted to the display unit 40 and the counting section 25, for example, and is subjected to predetermined processing in each of the sections. Some of the image data generated by the image processing section 23 are outputted to an external apparatus (not illustrated) connected to the control unit 20 via the external interface section 26.

The signal analysis section 24 is a circuit section configured to receive the output signal from the signal reading section 22 and perform various types of data analysis processing to generate various types of information data. The signal analysis section 24 detects an in-focus state of the observation object based on the distance information (distance data) obtained from the image signal generated by the solid state image sensor 11, phase difference information (focus data) about an image, and the like, for example, to calculate information used for automatic focus adjustment processing (AF processing), and detects a luminance of the image, and the like, to calculate information used for automatic exposure adjustment processing (AE processing) and automatic white balance adjustment processing.

The counting section 25 is a circuit section configured to perform counting processing for the observation object based on the counting processing image data generated by the image processing section 23.

In the observation apparatus 1 according to the present embodiment, the sample such as the cell within the incubator, for example, is used as the observation object. The above-described counting section 25 is specifically assumed to performed counting processing for the sample such as the cell.

An external interface section (abbreviated as an "external IF section" in FIG. 1) 26 is a connection unit including a connection circuit for ensuring connection to an external apparatus (not illustrated) connected to the control unit 20.

Examples of the external apparatus connected to the external IF section 26 include a data recording apparatus (a storage apparatus; not illustrated) which records the recording image data generated by the image processing section 23. In this case, the recording image data generated by the image processing section 23 is outputted to the data recording apparatus (not illustrated) serving as the external apparatus connected to the control unit 20 via the external IF section 26. The data recording apparatus records the received recording image data in a predetermined storage area.

The illumination unit 30 is a constituent unit including a light source configured to irradiate the observation object with illumination light. The illumination unit 30 is mainly configured by, for example, a first illumination section 31, a second illumination section 32, and an illumination light reflection plate 33.

The first illumination section 31 is a constituent section including an illumination member configured to emit first illumination light in the illumination light for illuminating the observation object and an illumination circuit for the illumination member. The first illumination light is, for example, illumination light contributing to forming normal image data of the observation object in the image signal generated by the solid state image sensor 11 (details of which will be described below).

The second illumination section 32 is a constituent section including an illumination member configured to emit second illumination light in the illumination light for illuminating the observation object and an illumination circuit for the illumination member. The second illumination light is, for example, illumination light contributing to forming information about a distance to the observation object or special image data in the image signal generated by the solid state image sensor 11 (an infrared image, fluorescence image data, etc.) (details of which will be described below).

The illumination light reflection plate 33 is a constituent configured to reflect the illumination light emitted from each of the first illumination section 31 and the second illumination section 32 toward the observation object. The illumination light reflection plate 33 includes a reflection surface on which the illumination light is easily reflected. The illumination light reflected by the illumination light reflection plate 33 illuminates the observation object while being incident on a light receiving surface in the solid state image sensor 11 in the image pickup unit 10 after being transmitted by the observation object.

Although the illumination unit 30 is illustrated as an independent constituent unit in FIG. 1, the present invention is not limited to the form. For example, the illumination unit 30 may be included in the image pickup unit 10.

The above-described illumination light reflection plate 33 can be unrequired depending on a configuration of an illumination light source. For example, when illumination adapted to a TOF range image sensor is used as the second illumination section 32 corresponding to the second light receiving element 102, a predetermined function, i.e., a distance information detection function can be implemented without using the illumination light reflection plate 33.

The display unit 40 is a constituent unit configured to display an image of the observation object based on the image data acquired by the image pickup unit 10. The display unit 40 is a constituent unit including, for example, a display panel, a driving circuit for the display panel, and an input circuit for display image data (not illustrated). The display unit 40 is electrically connected to the control unit 20. The display unit 40 receives the display image data generated by the image processing section 23 and displays the image of the observation object using a display panel (not illustrated).

The incubator 50 is a container configured to accommodate a sample 51 serving as the observation object to form a closed space from outside air. The incubator 50 is formed of a transparent member using glass or a member made of resin to be able to transmit illumination light. Note that as the incubator 50, incubators in a normal form conventionally generally used can be applied.

Assuming that other configurations of the observation apparatus 1 are respectively similar to configurations in a conventionally general form, description and illustration of respective configurations of other sites are omitted.

In the image pickup unit 10 in the observation apparatus 1 thus configured, the solid state image sensor 11 according to the present embodiment is applied.

A detailed configuration of the solid state image sensor 11 according to the present embodiment will be described below with reference to FIGS. 2 to 4.

Figure 2:
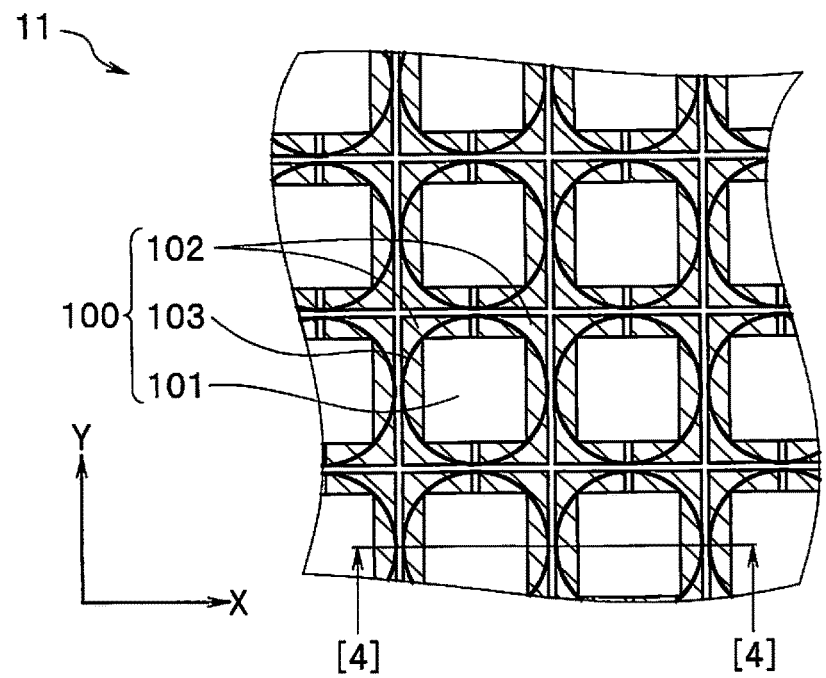
FIG. 2 is a plan view illustrating a part of a light receiving surface in the solid state image sensor according to the one embodiment of the present invention in an enlarged manner.
Figure 3:
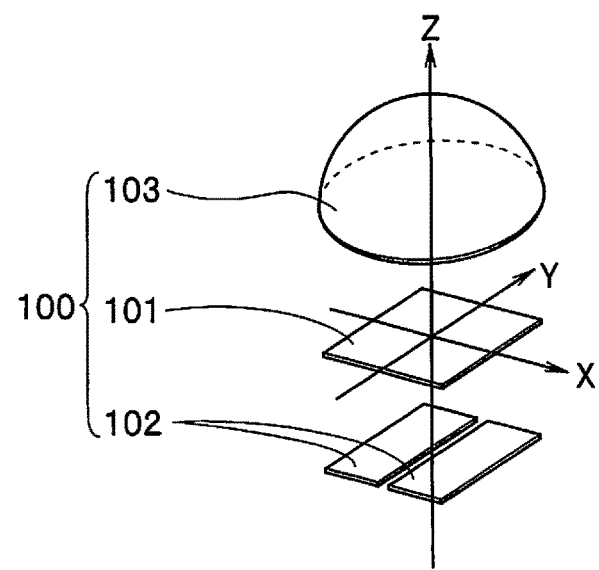
FIG. 3 is an exploded perspective view of a principal part conceptually illustrating an extracted light receiving section in one unit of a light receiving section configuring the solid state image sensor according to the one embodiment of the present invention.
Figure 4:
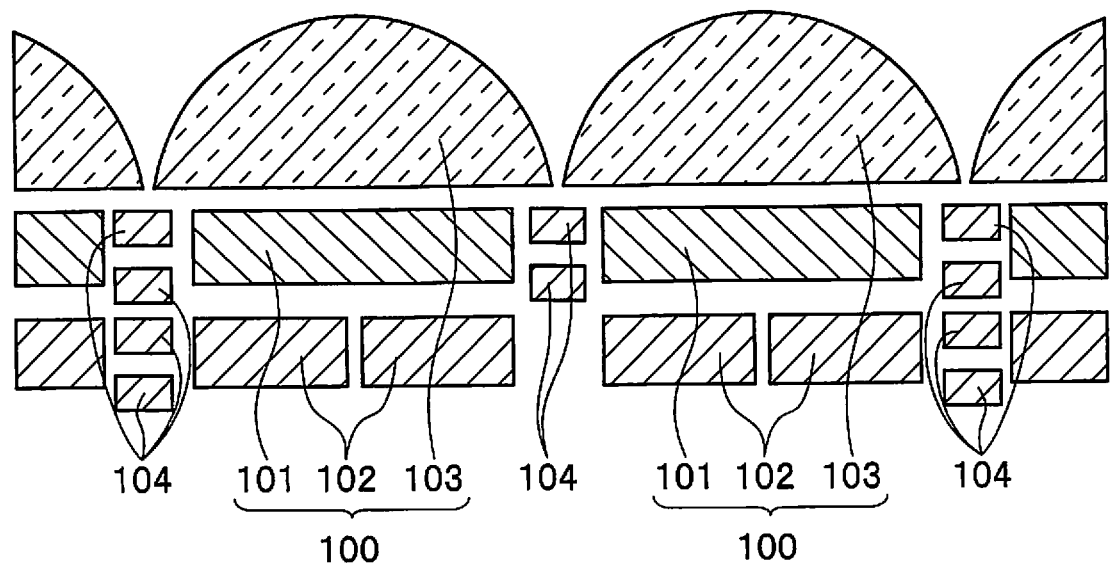
FIG. 4 is a cross-sectional view illustrating a part of a light receiving surface in the solid state image sensor according to the one embodiment of the present invention in an enlarged manner and taken along a line [4]-[4] illustrated in FIG. 2.

FIGS. 2 to 4 are diagrams each conceptually illustrating the configuration of the solid state image sensor according to the one embodiment of the present invention, where FIG. 2 is a plan view illustrating a part of a light receiving surface in the solid state image sensor according to the one embodiment of the present invention in an enlarged manner. FIG. 3 is an exploded perspective view of a principal part conceptually illustrating an extracted light receiving section in one unit of a light receiving section configuring the solid state image sensor according to the one embodiment of the present invention. FIG. 4 is a cross-sectional view illustrating a part of the light receiving surface in the solid state image sensor according to the one embodiment of the present invention in an enlarged manner. Note that FIG. 4 illustrates a cross section along a line [4]-[4] illustrated in FIG. 2.

The solid state image sensor 11 according to the present embodiment is the photoelectric conversion element configured to receive an optical image of an observation object and generate an image signal of the observation object and at the same time acquire the various types of information such as distance data to the observation object, as described above.

The solid state image sensor 11 includes a plurality of light receiving sections 100 formed in a two-dimensional array, as illustrated in FIG. 2. A two-dimensional plane on which the plurality of light receiving sections 100 are arranged is a surface parallel to an XY plane including an X-axis and a Y-axis illustrated in FIGS. 2 and 3. The two-dimensional plane is hereinafter referred to as a light receiving surface. As illustrated in FIG. 3, an axis perpendicular to the above-described XY plane (light receiving surface) is indicated by a symbol Z, and the Z-axis is referred to as an optical axis of a microlens 103.

The light receiving section 100 in one unit in the solid state image sensor 11 according to the present embodiment is mainly configured by, for example, a first light receiving element 101, a second light receiving element 102, a microlens 103, a wiring 104, and a circuit board.

Each of the light receiving sections 100 in the above-described units configuring the solid state image sensor 11 according to the present embodiment is configured such that the microlens 103, the first light receiving element 101, and the second light receiving element 102 configure a stacked structure in descending order from an upper layer, as illustrated in FIGS. 3 and 4.

The microlens 103 is a so-called on-chip microlens provided on the light receiving surface. The microlens 103 is an optical member configured to form an optical image of the observation object on a predetermined image forming surface by incidence of light from the observation object. The first light receiving element 101 is provided in a layer portion below the microlens 103.

The first light receiving element 101 is a light receiving element (an electronic component) for normal image information acquisition configured to receive light from the observation object incident via the microlens 103 and acquire normal image data. To the first light receiving element 101, a photodiode configured to generate charge by detecting light, for example, is applied. Note that in the present embodiment, an example in which the first light receiving element 101 is formed by a single light receiving surface is illustrated. The second light receiving element 102 is provided in a layer portion below the first light receiving element 101.

The second light receiving element 102 is a light receiving element (electronic component) for range image detection configured to receive light from an observation object incident via the microlens 103 and the first light receiving element 101 and acquire distance data about a distance to the observation object. The second light receiving element 102 is a range image sensor (referred to as a TOF range image sensor) configured to measure a distance using a TOF (time of flight) method.

The TOF range image sensor is a device (sensor) configured to directly measure and acquire distance data using a light receiving element configured to respond to a phase change of light incident after illumination light is reflected by an observation object or a delay time caused by flight of light.

Note that an example in which the second light receiving element 102 is divided into two light receiving surfaces is illustrated in the present embodiment. In this case, an example in which each of the two divided light receiving surfaces forming the second light receiving element 102 is arranged such that a long side of the light receiving surface is parallel to a vertical direction (Y direction) on the light receiving surface is illustrated.

In a layer portion below the second light receiving element 102, a circuit board on which a signal processing circuit or a temporary memory, for example, is mounted is disposed, although not illustrated. As illustrated in FIG. 4, a wiring 104 or the like is disposed in a space between light receiving elements adjacent to each other, for example.

Note that the second light receiving element 102 is a region portion indicated by hatching in FIG. 2. That is, the indication by hatching in FIG. 2 is used not to illustrate a cross section of a member but merely specify an arrangement region of the second light receiving element 102.

The above-described light receiving section 100 thus configured is configured such that the microlens 103, the first light receiving element 101, and the second light receiving element 102 configure a stacked structure in descending order from an upper layer, as described above. Accordingly, the light receiving section 100 is configured such that light, which has been transmitted by the first light receiving element 101, is incident on the second light receiving element 102. Thus, an amount of light incident on the second light receiving element 102 is more decreased than an amount of light incident on the first light receiving element 101. Therefore, to supplement the decrease, a light receiving area of the second light receiving element 102 is set larger than a light receiving area of the first light receiving element 101.

Note that although the light receiving area of the second light receiving element 102 is set larger than the light receiving area of the first light receiving element 101 in FIG. 2, no problem occurs even if the first light receiving element and the second light receiving element are configured in the same size.

Note that in the solid state image sensor 11 according to the present embodiment, the first light receiving element 101 and the second light receiving element 102 may use a rolling shutter function for sequentially reading out signals for each column or may use a global shutter function for enabling respective signals from all elements (pixels) to be simultaneously and collectively read out. The first light receiving element and the second light receiving element may respectively select different reading functions.

Various types of modifications for the configuration of the light receiving section in the above-described solid state image sensor 11 according to the one embodiment will be described below.

[First Modification]

In the above-described one embodiment, an example in which the first light receiving element 101 in the light receiving section 100 is formed by the single light receiving surface is illustrated. On the other hand, in a first modification described below, an example in which a first light receiving element is configured by a plurality of divided light receiving elements is illustrated.

Figure 5:
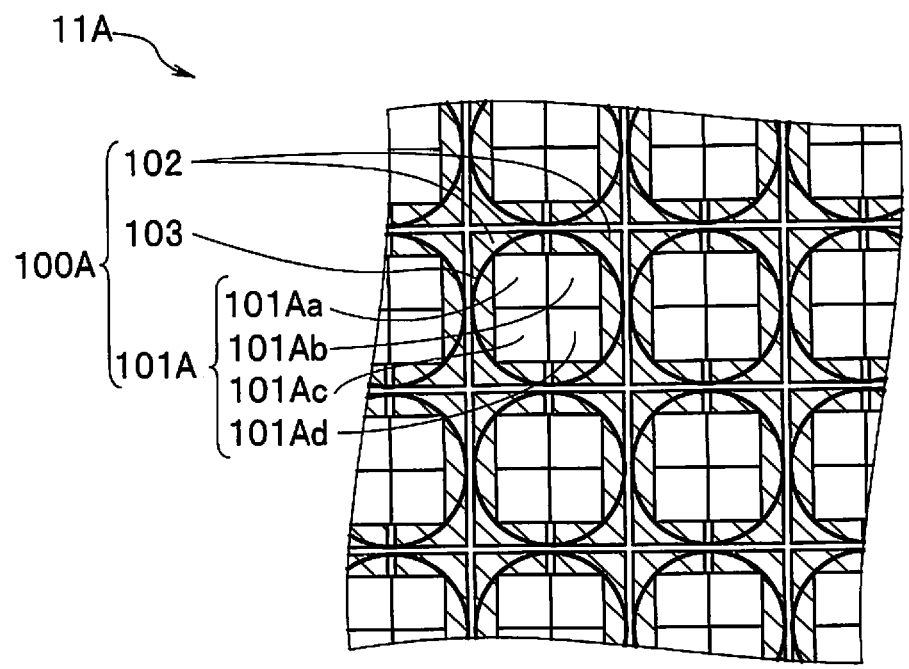
FIG. 5 is a plan view illustrating a part of a light receiving surface in a solid state image sensor to which a light receiving section in a first modification is applied in an enlarged manner in the solid state image sensor according to the one embodiment of the present invention.
Figure 6:
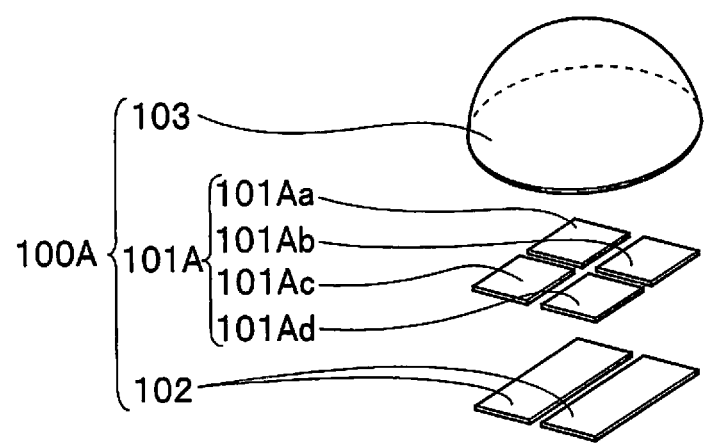
FIG. 6 is an exploded perspective view of a principal part conceptually illustrating the extracted light receiving section in one unit in the first modification in the solid state image sensor according to the one embodiment of the present invention.

FIGS. 5 and 6 are diagrams each illustrating the first modification relating to a light receiving section in the solid state image sensor according to the one embodiment of the present invention. FIG. 5 is a plan view illustrating a part of a light receiving surface in a solid state image sensor 11A, to which light receiving sections in the first modification are applied, in an enlarged manner (corresponding to FIG. 2). FIG. 6 is an exploded perspective view of a principal part conceptually illustrating the extracted light receiving section in one unit in the first modification (corresponding to FIG. 3).

A light receiving section 100A in the first modification is configured to include four light receiving elements 100Aa, 101Ab, 101Ac, and 101Ad obtained by dividing a first light receiving element 101A. The other configuration is similar to the configuration in the above-described one embodiment.

If such a configuration is used, the plurality of light receiving elements (101Aa, 101Ab, 101Ac, and 101Ad) in the first light receiving element 101A can respectively generate different image data representing optical images having different phases.

Therefore, according to the configuration, the first light receiving element 101A can generate focus data relating to focusing by detecting a phase difference based on the plurality of image data acquired by the plurality of light receiving elements (101Aa, 101Ab, 101Ac, and 101Ad), and at the same time can also generate normal one image data by performing addition processing of the plurality of image data.

[Second Modification]

In the above-described one embodiment, an example in which the second light receiving element 102 in the light receiving section 100 is formed by the two divided light receiving surfaces and is arranged such that a long side of each of the light receiving surfaces is parallel to the vertical direction (Y direction) on the light receiving surface is illustrated. On the other hand, in a second modification described below, an example in which light receiving surfaces in a second light receiving element are differently arranged is illustrated.

Figure 7:
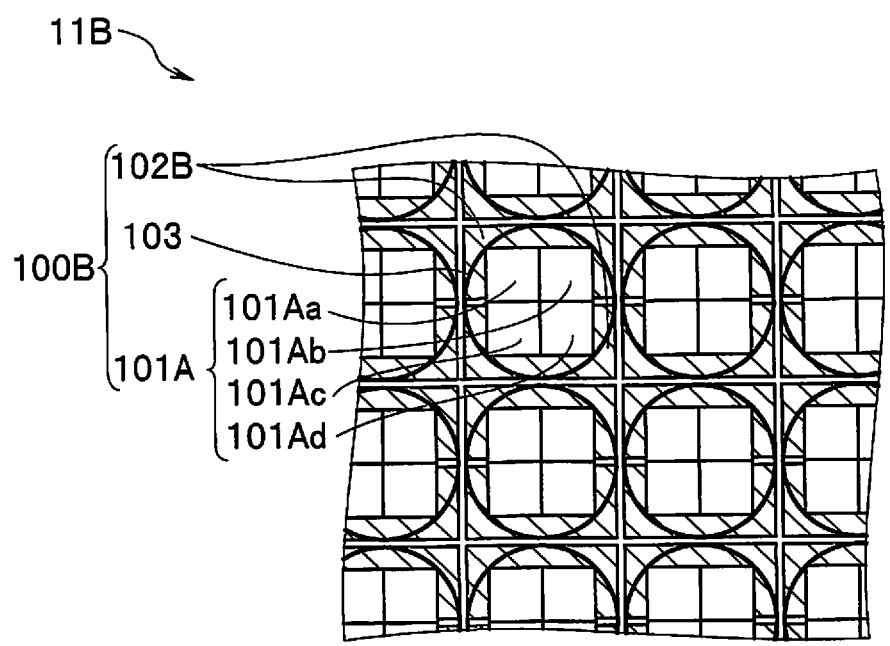
FIG. 7 is a plan view illustrating a part of a light receiving surface in a solid state image sensor to which a light receiving section in a second modification is applied in an enlarged manner in the solid state image sensor according to the one embodiment of the present invention.
Figure 8:
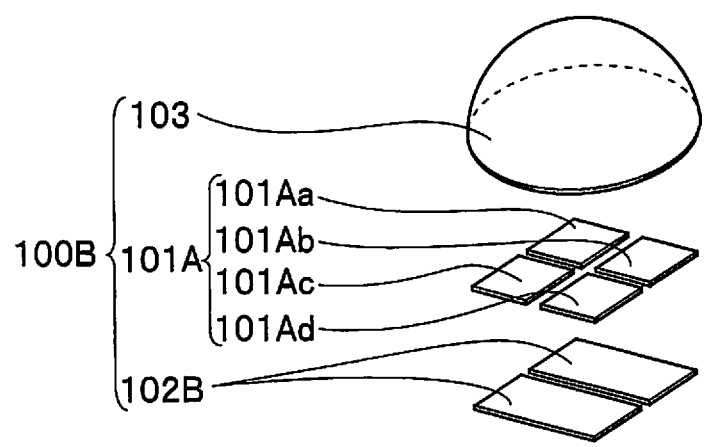
FIG. 8 is an exploded perspective view of a principal part conceptually illustrating the extracted light receiving section in one unit in the second modification in the solid state image sensor according to the one embodiment of the present invention.

FIGS. 7 and 8 are diagrams each illustrating the second modification relating to a light receiving section in the solid state image sensor according to the one embodiment of the present invention. FIG. 7 is a plan view illustrating a part of a light receiving surface in a solid state image sensor 11B, to which light receiving sections in the second modification are applied, in an enlarged manner (corresponding to FIG. 2). FIG. 8 is an exploded perspective view of a principal part conceptually illustrating the extracted light receiving section in one unit in the second modification (corresponding to FIG. 3).

The second modification is similar to the above-described one embodiment in that a light receiving section 100B in the second modification is formed by two light receiving surfaces obtained by dividing a second light receiving element 102B. The second modification differs from the one embodiment in that each of the light receiving surfaces is arranged such that a long side of the light receiving surface is parallel to a horizontal direction (X direction) on the light receiving surface.

Note that the second modification is similar to the above-described first modification in that a first light receiving element 101A is configured to include four divided light receiving elements 101Aa, 101Ab, 101Ac, and 101Ad. The other configuration is similar to the configuration in the above-described one embodiment.

Effects produced when such a configuration is used are similar to effects in the above-described first modification.

[Third Modification]

In the above-described one embodiment and first and second modifications, an example in which the second light receiving element in the light receiving section is formed by two divided light receiving surfaces is illustrated. On the other hand, in a third modification described below, an example in which a second light receiving element is configured as a single light receiving surface is illustrated.

Figure 9:
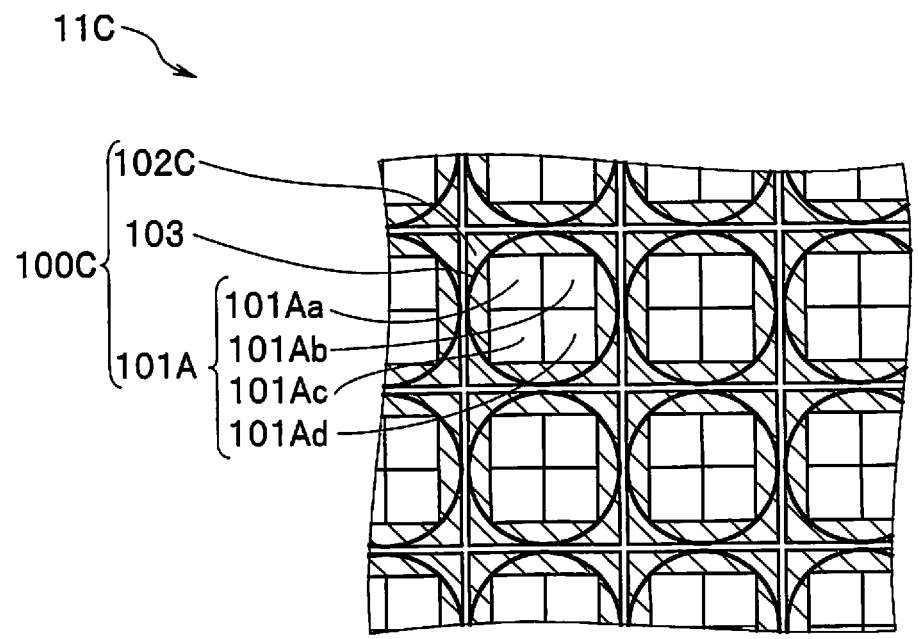
FIG. 9 is a plan view illustrating a part of a light receiving surface in a solid state image sensor to which a light receiving section in a third modification is applied in an enlarged manner in the solid state image sensor according to the one embodiment of the present invention.
Figure 10:
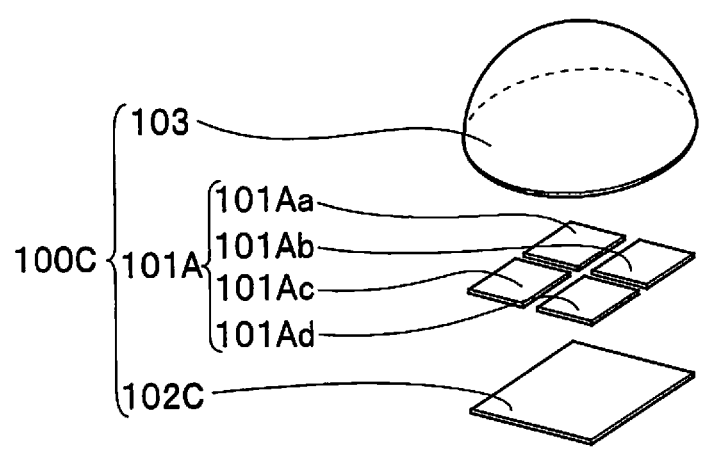
FIG. 10 is an exploded perspective view of a principal part conceptually illustrating the extracted light receiving section in one unit in the third modification in the solid state image sensor according to the one embodiment of the present invention.

FIGS. 9 and 10 are diagrams each illustrating the third modification relating to a light receiving section in the solid state image sensor according to the one embodiment of the present invention. FIG. 9 is a plan view illustrating a part of a light receiving surface in a solid state image sensor 11C, to which light receiving sections in the third modification are applied, in an enlarged manner (corresponding to FIG. 2). FIG. 10 is an exploded perspective view of a principal part conceptually illustrating the extracted light receiving section in one unit in the third modification (corresponding to FIG. 3).

A light receiving section 100C in the third modification differs from the light receiving sections in the above-described one embodiment and first and second modifications in that a second light receiving element 102C is formed by a single light receiving surface.

Note that the third modification is similar to the above-described first and second modifications in that a first light receiving element 101A is configured to include four divided light receiving elements 101Aa, 101Ab, 101Ac, and 101Ad. The other configuration is similar to the configuration in the above-described one embodiment.

If such a configuration is used, a light receiving area of the second light receiving element 102C can be ensured to be larger. Therefore, precision of data (e.g., distance data) obtained by the second light receiving element 102C can be enhanced. Other effects are similar to the effects in the above-described first and second modifications.

[Fourth Modification]

In the above-described third modification, an example in which the second light receiving element in the light receiving section in one unit is formed by the single light receiving surface is illustrated. On the other hand, in a fourth modification described below, an example in which a second light receiving element formed by a single light receiving surface is provided for four microlenses and four first light receiving elements and is configured as a light receiving section in one unit is illustrated.

Figure 11:
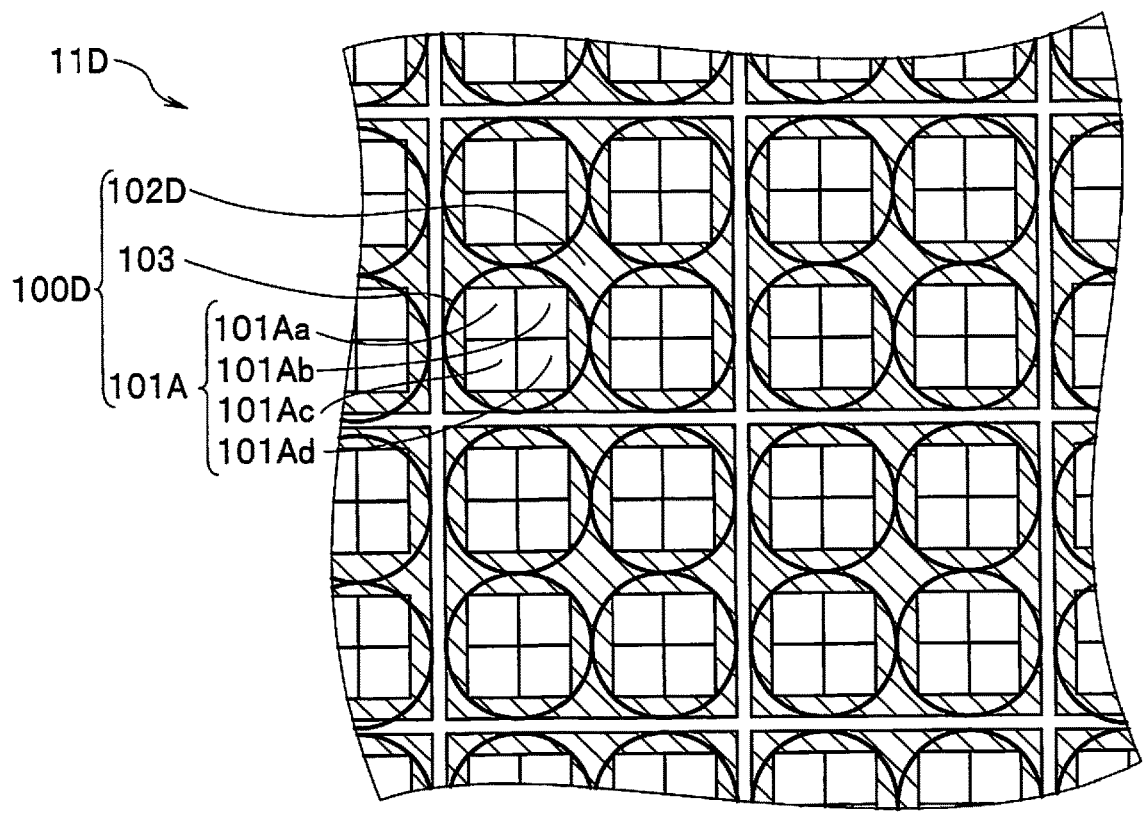
FIG. 11 is a plan view illustrating a part of a light receiving surface in a solid state image sensor to which a light receiving section in a fourth modification is applied in an enlarged manner in the solid state image sensor according to the one embodiment of the present invention.
Figure 12:
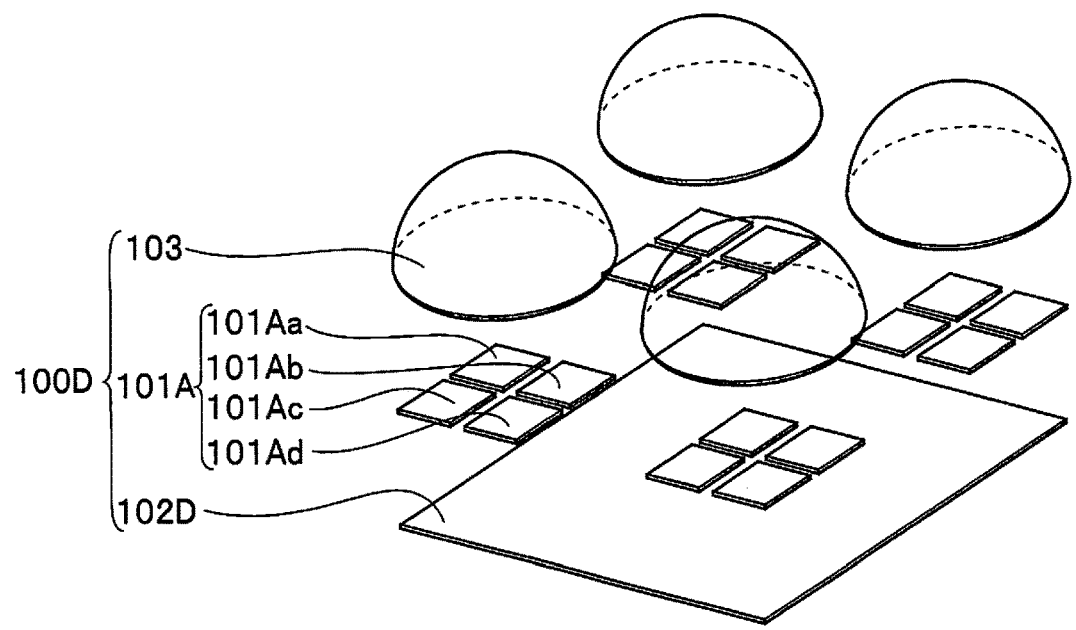
FIG. 12 is an exploded perspective view of a principal part conceptually illustrating the extracted light receiving section in one unit in the fourth modification in the solid state image sensor according to the one embodiment of the present invention.

FIGS. 11 and 12 are diagrams each illustrating the fourth modification relating to the light receiving section in the solid state image sensor according to the one embodiment of the present invention. FIG. 11 is a plan view illustrating a part of a light receiving surface in a solid state image sensor 11D, to which light receiving sections in the fourth modification are applied, in an enlarged manner (corresponding to FIG. 2). FIG. 12 is an exploded perspective view of a principal part conceptually illustrating the extracted light receiving section in one unit in the fourth modification (corresponding to FIG. 3).

A light receiving section 100D in one unit in the fourth modification is configured by, for example, four microlens 103, four first light receiving elements 101A, and one second light receiving element 102D.

In this case, as the four microlenses 103, a microlens in the same form as forms of the microlenses 103 in the above-described one embodiment and the above-described modifications is applied. As the four first light receiving elements 101A, a first light receiving element in the same form as forms of the first light receiving elements 101A in the above-described modifications is applied.

In the fourth modification, the second light receiving element 102D is configured by a single light receiving surface. The second light receiving element 102D is configured to have a light receiving area covering the above-described four microlenses 103 and the above-described four first light receiving elements 101A. The other configuration is similar to the configuration in the above-described one embodiment.

If such a configuration is used, the light receiving area of the second light receiving element 102D can be ensured to be still larger.

[Fifth Modification]

Although in the above-described one embodiment and modifications, an example in which a TOF range image sensor is applied as the second light receiving element is illustrated, other light receiving elements may be applied as the second light receiving element regardless of the above-described example.

Figure 13:
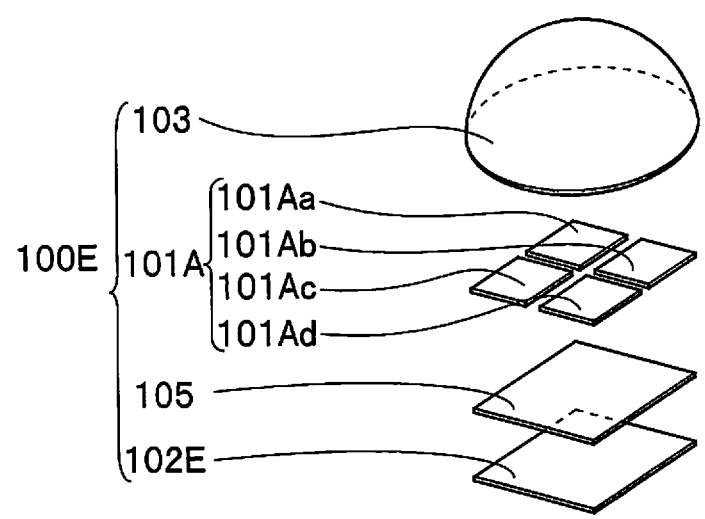
FIG. 13 is an exploded perspective view of a principal part conceptually illustrating the extracted light receiving section in one unit in a fifth modification in the solid state image sensor according to the one embodiment of the present invention.

In a fifth modification illustrated in FIG. 13, for example, a similar photodiode to the first light receiving element 101A is applied as a second light receiving element 102E. In addition, a color filter 105 configured to pass only light in a predetermined wavelength region is provided between the first light receiving element 101A and the second light receiving element 102E. In this case, the above-described color filter 105 is, for example, a barrier filter.

Correspondingly, as a second illumination section 32 in an illumination unit 30 (not illustrated in FIG. 13), illumination for irradiating an observation object with excitation light is applied.

When such a configuration is used, normal observation is performed using a first light receiving element 101A, and at the same time special observation (fluorescence observation in the above-described example) using the second light receiving element 102E can be performed.

Note that special observation in another form can be performed when the above-described color filter 105 and the second illumination section 32 are changed, as needed. For example, the second illumination section 32 may be changed, by applying a color filter 105 configured to transmit only light in a specific wavelength region (e.g., infrared light or ultraviolet light), into a second illumination section 32 configured to emit illumination light corresponding to the color filter.

In the above-described one embodiment and modifications, the normal image obtained by the first light receiving element is a monochrome image. However, a color image may be made acquirable by providing the color filter between the microlens 103 and the first light receiving element 101A. The color filter in such a configuration has a similar configuration to a configuration of a conventional solid state image sensor configured to be able to acquire a color image, and hence illustration and detailed description of the color filter are omitted.

Note that each of the solid state image sensors in the above-described one embodiment and the above-described modifications may be in such a form that all the plurality of light receiving sections formed in a two-dimensional array are applied as the light receiving sections in the form illustrated in the above-described example, or may be, as another form, in such a form that the light receiving sections in the example are applied to some of the plurality of light receiving sections. For example, a part of an arrangement of the color filter may be made clear (transparent).

Figure 14:
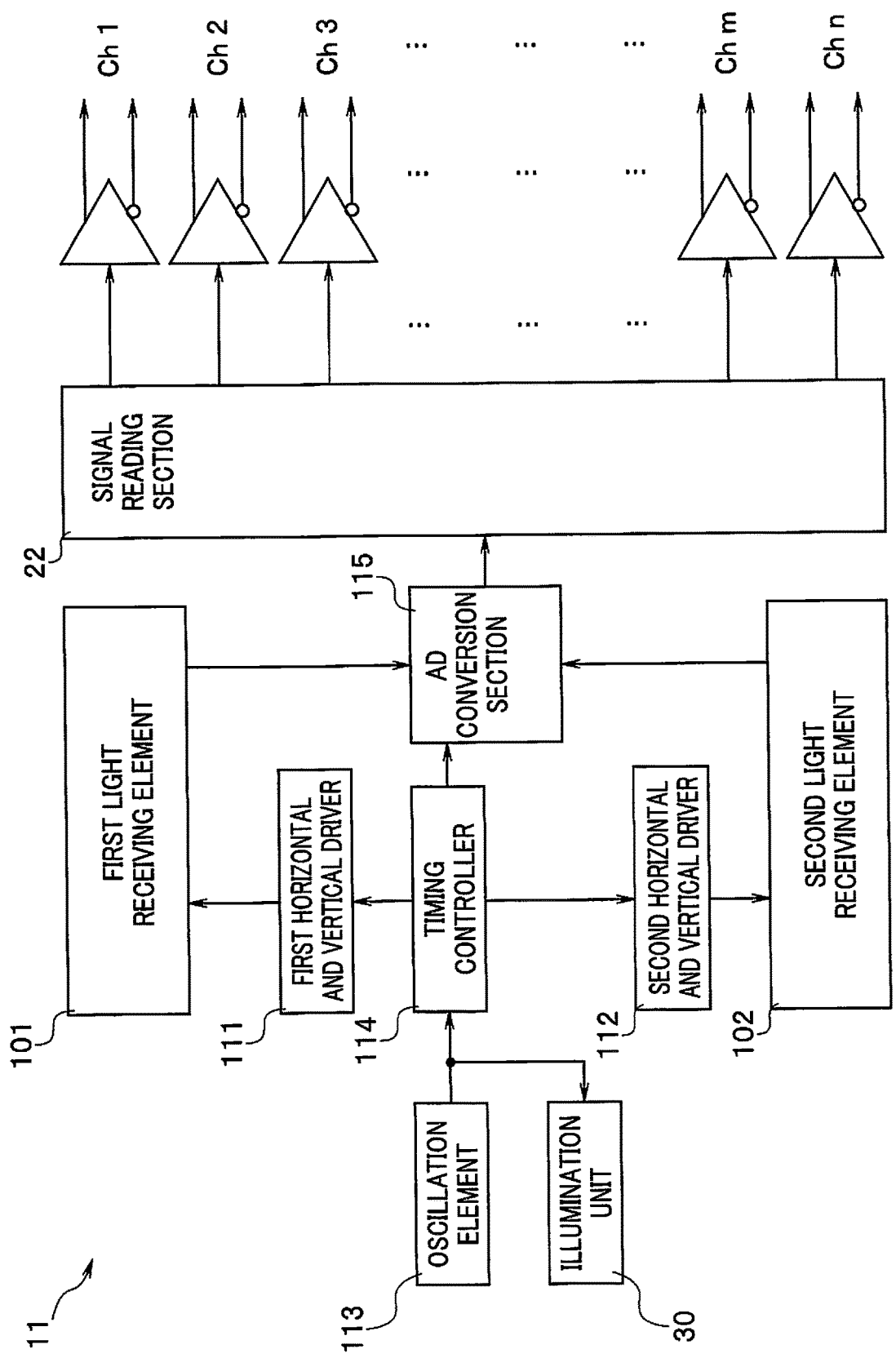
FIG. 14 is a block configuration diagram illustrating the outline of an electrical configuration of the solid state image sensor according to the one embodiment of the present invention.

The outline of an electrical configuration of the solid state image sensor according to the one embodiment of the present invention will be described below with reference to FIG. 14. FIG. 14 is a block configuration diagram illustrating the outline of the electrical configuration of the solid state image sensor according to the one embodiment of the present invention.

The solid state image sensor 11 according to the above-described one embodiment is controlled to be driven by the control section 21 in the control unit 20, as described above.

The above-described control section 21 controls respective operation timings of a first horizontal and vertical driver 111 and a second horizontal and vertical driver 112 via a timing controller 114 illustrated in FIG. 14, to drive a first light receiving element 101 and a second horizontal and vertical driver 112. In this case, the first light receiving element 101 and a second light receiving element 102 are respectively controlled to be driven by the first horizontal and vertical driver 111 and the second horizontal and vertical driver 112. Each of respective output signals (analog image signals) from the first light receiving element 101 and the second light receiving element 102 is outputted to an AD conversion section 115.

The above-described control section 21 controls an operation timing of the AD conversion section 115 via the timing controller 114 illustrated in FIG. 14. The AD conversion section 115 is a circuit section configured to receive each of the output signals (analog image signals) from the first light receiving element 101 and the second light receiving element 102 and convert the output signal into a digital image signal. The digital image signal generated by the AD conversion section 115 is outputted to a signal reading section 22. Upon receipt of the digital image signal, the signal reading section 22 performs data rearrangement processing, for example, for the inputted digital image signal, and then outputs the digital image signal to the image processing section 23 (see FIG. 1).

The above-described control section 21 also controls an operation timing of the illumination unit 30 via the timing controller 114 illustrated in FIG. 14.

The timing controller 114 is a circuit section configured to output a timing pulse required to drive each of the first light receiving element 101, the second light receiving element 102, the AD conversion section 115, and the illumination unit 30. The timing pulse outputted from the timing controller 114 is outputted at a timing previously set while referring to a pulse signal outputted at a constant timing from an oscillation element 113.

Note that although the above-described illumination unit 30 is configured to be included in the solid state image sensor 11 in each of the above-described examples, the present invention is not limited to such a form. That is, if a configuration in which the operation timing of the illumination unit 30 can be reliably and accurately controlled, the illumination unit 30 may be configured as a separate unit.

In the above-described configuration example illustrated in FIG. 14, the one signal reading section 22 is provided, and all the image signals outputted from the first light receiving element 101 and the second light receiving element 102 are outputted to the one signal reading section 22.

In the solid state image sensor 11 according to the present embodiment, driving control to bring, in a driving period of one of the light receiving elements, the other light receiving element into a non-driving state is performed, although details are described below. Thus, in the solid state image sensor 11 in the configuration example illustrated in FIG. 14, the signal reading section 22 is being substantially always driven.

Figure 15:
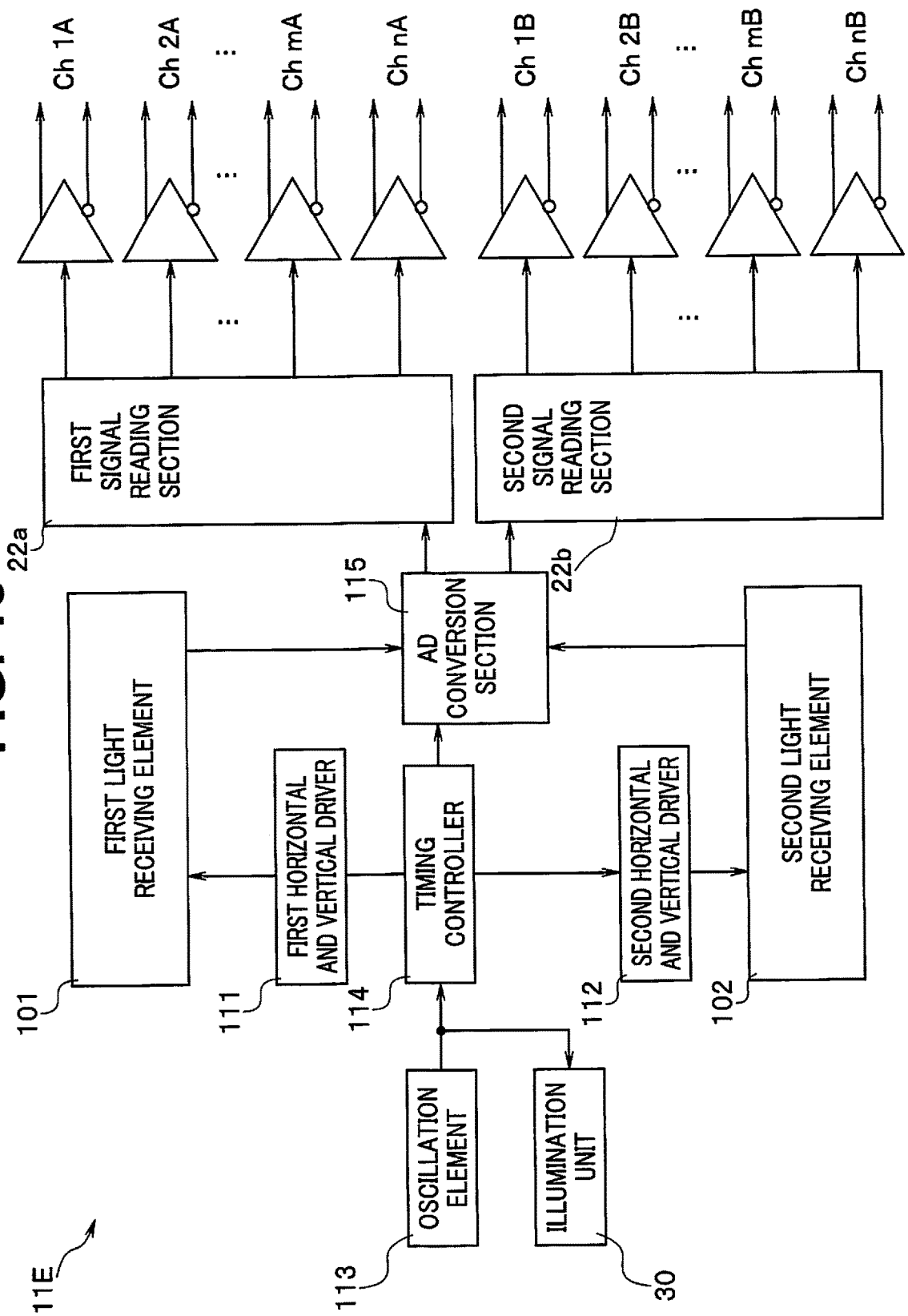
FIG. 15 is a block configuration diagram illustrating another modification of the electrical configuration of the solid state image sensor according to the one embodiment of the present invention.

On the other hand, as another form, a configuration example illustrated in FIG. 15 is considered. FIG. 15 is a block configuration diagram illustrating another modification for an electrical configuration of the solid state image sensor according to the one embodiment of the present invention.

In another modification illustrated in FIG. 15, a first signal reading section 22a configured to handle only an output signal of a first light receiving element 101 and a second signal reading section 22b configured to handle only an output signal of a second light receiving element 102 are provided. The other configuration is similar to the configuration in the form illustrated in FIG. 14.

Thus, when respective output circuits of the first light receiving element 101 and the second light receiving element 102 are separately configured, even if the first light receiving element 101 and the second light receiving element 102 differ in output signal form, signal reading sections can be in forms respectively adapted to the respective light receiving elements so that respective circuit configurations of the signal reading sections can be simplified.

When the first signal reading section 22a is made to have a reading circuit configuration adapted to a normal image signal corresponding to the first light receiving element 101 (a normal image sensor), and the second signal reading section 22b is made to have a reading circuit configuration adapted to a range image signal corresponding to the second light receiving element 102 (a TOF range image sensor), for example, the respective circuit configurations of the signal reading sections can be simplified.

Further, the signal reading sections 22a and 22b may be respectively driven to match driving timings of the corresponding light receiving elements 101 and 102. Therefore, the signal reading sections 22a and 22b can also be respectively brought into non-driven states in non-driving periods of the light receiving elements 101 and 102. Therefore, the configuration example of present modification can contribute to lower power consumption than the configuration example illustrated in FIG. 14.

Note that although in the configuration examples illustrated in FIGS. 14 and 15, an example in which the timing controller 114 and the AD conversion section 115 are integrated is illustrated, the present invention is not limited to such a form. For example, a timing controller and an AD conversion section corresponding to each of the first light receiving element and the second light receiving element may be provided.

Figure 16:
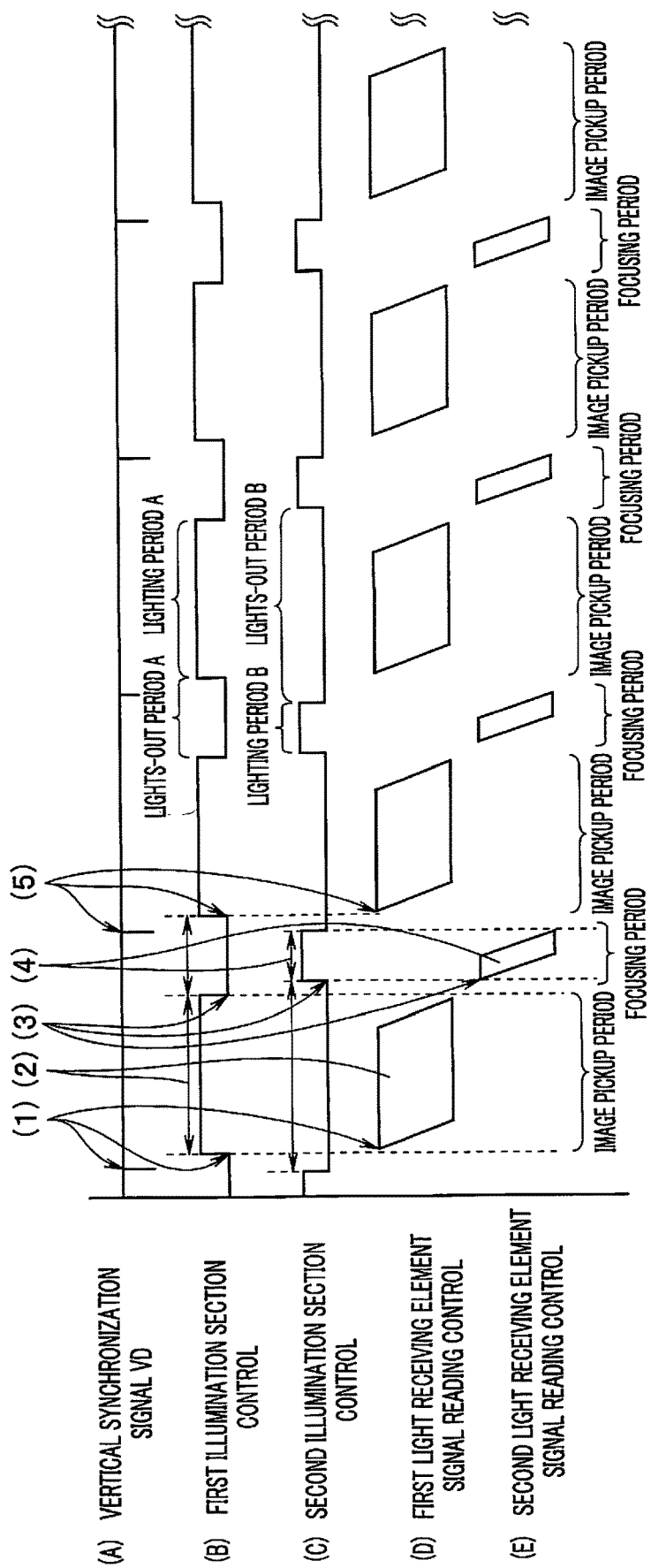
FIG. 16 is a timing chart illustrating a function of the solid state image sensor according to the one embodiment of the present invention.

A function of the solid state image sensor 11 according to the above-described one embodiment thus configured will be described below with reference to FIG. 16. FIG. 16 is an example of a timing chart illustrating the function of the solid state image sensor according to the present embodiment.

First, in a conduction state where an apparatus to which the solid state image sensor 11 is applied is operable, the timing controller 114 generates a vertical synchronization signal VD at a predetermined timing ((A)-(1) in FIG. 16) under control of section 21 of control unit 20.

Upon receipt of the vertical synchronization signal, the control section 21 starts driving control of the first illumination section 31 in the illumination unit 30 ((B)-(1) in FIG. 16).

At the same time, the control section 21 starts driving control of the first light receiving element 101 via the first horizontal and vertical driver 111 while performing driving control of the AD conversion section 115 and the signal reading section 22, to perform signal reading control of an output signal of the first light receiving element 101 ((D)-(1) in FIG. 16).

In this case, the driving control of the first illumination section 31 is performed only in a predetermined period previously set (a lighting period A in FIG. 16) ((B)-(2) in FIG. 16). Similarly, driving control of the first light receiving element 101 is also performed only in a predetermined period previously set (an image pickup period in FIG. 16) ((D)-(2) in FIG. 16). Note that during the lighting period A of the first illumination section 31, the second illumination section 32 is in a non-driven state and in a lights-out state (a light-out period B in FIG. 16).

When the predetermined lighting period A and the predetermined image pickup period have elapsed, the control section 21 controls the first illumination section 31 to stop driving ((B)-(3) in FIG. 16) while starting driving control of the second illumination section 32 ((C)-(3) in FIG. 16).

At the same time, the control section 21 controls the first light receiving element 101 to stop driving while starting driving control of the second light receiving element 102, to perform signal reading control of an output signal of the second light receiving element 102 ((E)-(3) in FIG. 16). Note that the driving control of the AD conversion section 115 and the signal reading section 22 is continuously performed.

In this case, the driving control of the second illumination section 32 is performed only in a predetermined period previously set (a lighting period B in FIG. 16) ((C)-(4) in FIG. 16). During the lighting period B of the second illumination section 32, the first illumination section 31 enters a non-lighting state (a lights-out period A in FIG. 16).

Similarly, the driving control of the second light receiving element 102 is also performed only in a second image pickup period (a focusing period illustrated in FIG. 16 corresponds to the second image pickup period in the present embodiment) serving as a predetermined period previously set ((E)-(4) in FIG. 16). During the focusing period, the first light receiving element 101 is in a non-driven state.

If the predetermined lighting period B and the predetermined focusing period have elapsed, the control section 21 controls the second illumination section 32 to stop driving, and at the same time controls the second light receiving element 102, the AD conversion section 115, and the signal reading section 22 to stop driving.

Then, the control section 21 waits for the vertical synchronization signal VD again ((A)-(5) in FIG. 16), to perform similar operations, i.e., start of the driving control of the first illumination section 31 ((B)-(5) in FIG. 16), and the driving control of the AD conversion section 115 and the driving control of the signal reading section 22 ((D)-(5) in FIG. 16). A similar function is hereinafter repeated.

Although in a first function example illustrated in FIG. 16, described above, such a function as to read out the output signal of the first light receiving element 101 and then read out the output signal of the second light receiving element 102 is performed, the present invention is not limited to such an example.

Figure 17:
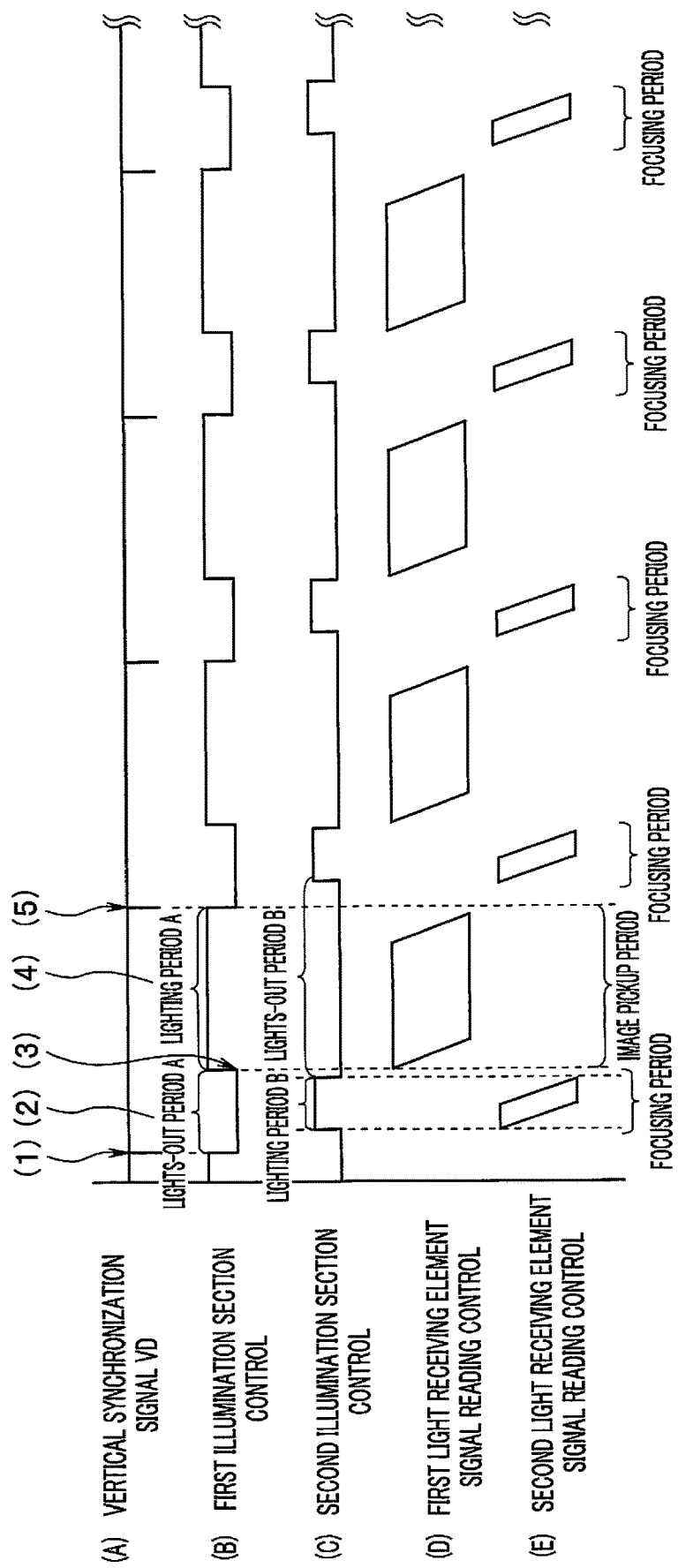
FIG. 17 is a timing chart illustrating a second function example of the solid state image sensor according to the one embodiment of the present invention.

As in a second function example illustrated in FIG. 17, for example, such a function as to first read out an output signal of the second light receiving element 102 after receiving a timing signal and then read out an output signal of the first light receiving element 101 may be performed.

In FIG. 17, when a vertical synchronization signal VD is generated from the timing controller 114 ((A)-(1) in FIG. 17), the control section 21 controls the first illumination section 31 in the illumination unit 30 to stop driving upon receipt of the vertical synchronization signal (when driving is being performed; (B) in FIG. 17) while starting driving control of the second illumination section 32 ((C) in FIG. 17).

At the same time, the control section 21 starts driving control of the second light receiving element 102 and performs driving control of the AD conversion section 115 and the signal reading section 22, to perform signal reading control of the output signal of the second light receiving element 102 ((E) in FIG. 17).

At this time, the driving control of the second illumination section 32 is performed only in a predetermined period previously set (a lighting period B in FIG. 17) ((B) in FIG. 17). Similarly, the driving control of the second light receiving element 102 is performed only in a predetermined period previously set (a focusing period in FIG. 17) ((E) in FIG. 17). During the lighting period B of the second illumination section 32, the first illumination section 31 is in a lights-out state (a lights-out period A in FIG. 17).

After the predetermined lighting period B and the predetermined focusing period have elapsed, the control section 21 stops driving the second illumination section 32 ((C) in FIG. 17) while starting driving control of the first illumination section 31 ((B)-(3) in FIG. 17).

At the same time, the control section 21 controls the second light receiving element 102 to stop driving while starting driving control of the first light receiving element 101, to perform signal reading control of the output signal of the first light receiving element 101 ((D)-(3) in FIG. 17).

At this time, the driving control of the first illumination section 31 is performed only in a predetermined period previously set (a lighting period A in FIG. 17) ((B)-(4) in FIG. 17). During the lighting period A of the first illumination section 31, the second illumination section 32 enters a non-lighting state (a lights-out period B in FIG. 17).

Similarly, the driving control of the first light receiving element 101 is also performed only in a predetermined period previously set (an image pickup period in FIG. 17) ((D) in FIG. 17). During the image pickup period, the second light receiving element 102 is in a non-driven state.

After the predetermined lighting period A and the predetermined image pickup period have elapsed, the control section 21 stops driving the first illumination section 31, and at the same time controls the first light receiving element 101 to stop driving.

Then, the control section 21 waits for the vertical synchronization signal VD again ((A)-(5) in FIG. 17), to perform similar operations, i.e., start of the driving control of the second illumination section 32 ((B) in FIG. 17), and the driving control of the AD conversion section 115 and the driving control of the signal reading section 22 ((E) in FIG. 17). A similar function is hereinafter repeated.

On the other hand, although such a function as to alternately read out the output signal of the first light receiving element 101 and the output signal of the second light receiving element 102 is performed in each of the above-described function examples illustrated in FIGS. 16 and 17, the present invention is not limited to such examples.

Figure 18:
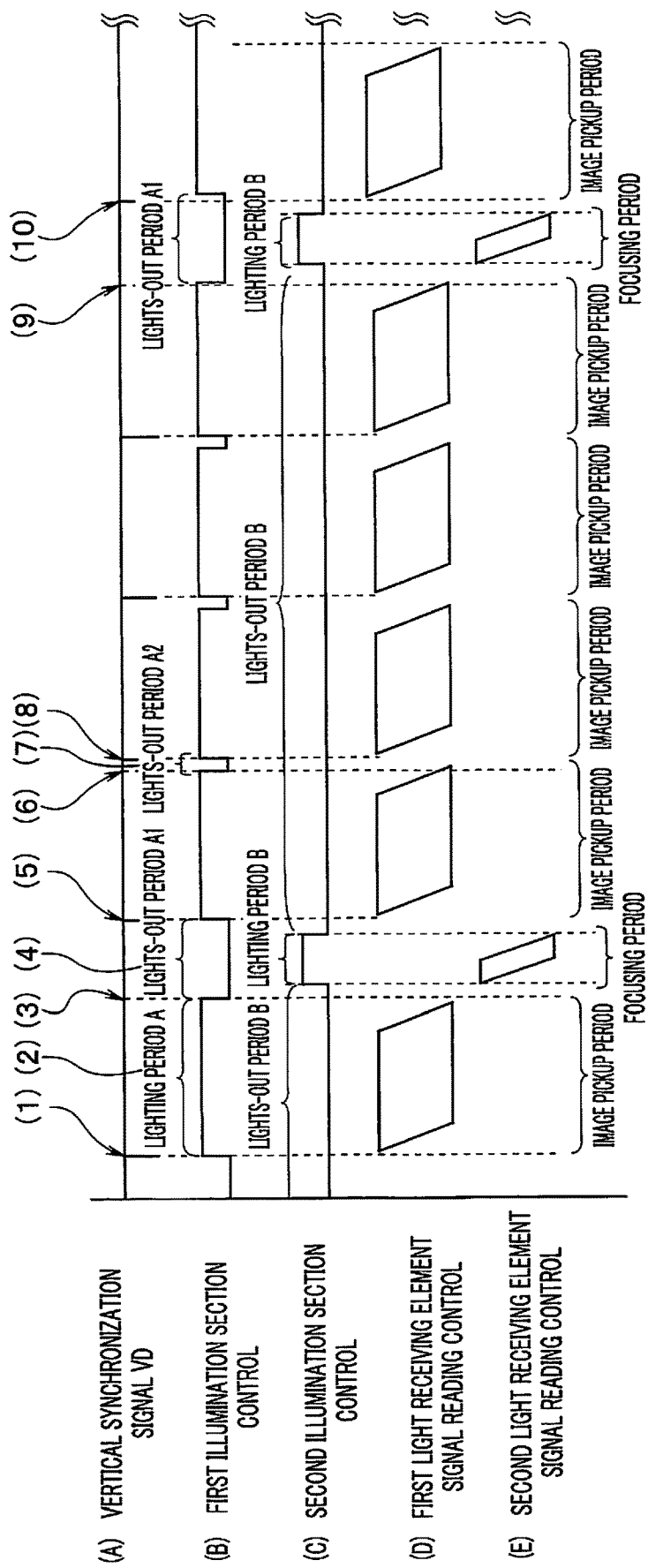
FIG. 18 is a timing chart illustrating a third function example of the solid state image sensor according to the one embodiment of the present invention.

As in a third function example illustrated in FIG. 18, for example, such a function as to intermittently read out an output signal of the second light receiving element 102 after reading out an output signal of the first light receiving element 101 a plurality of times may be performed.

In FIG. 18, when a vertical synchronization signal VD is generated from the timing controller 114 ((A)-(1) in FIG. 18), the control section 21 controls the first illumination section 31 in the illumination unit 30 to start driving control upon receipt of the vertical synchronization signal ((B) in FIG. 18). At this time, driving of the second illumination section 32 is stopped ((C) in FIG. 18).

At the same time, the control section 21 starts driving control of the first light receiving element 101 and performs driving control of the AD conversion section 115 and the signal reading section 22, to perform signal reading control of the output signal of the first light receiving element 101 ((D) in FIG. 18).

At this time, driving control of the first illumination section 31 is performed only in a predetermined period previously set (a lighting period A in FIG. 18) ((B)-(2) in FIG. 18). Similarly, the driving control of the first light receiving element 101 is also performed only in a predetermined period previously set (an image pickup period in FIG. 18) ((D) in FIG. 18). During the lighting period A of the first illumination section 31, the second illumination section 32 is in a lights-out state (a lights-out period B in FIG. 18).

After the predetermined lighting period A and the predetermined image pickup period have elapsed, the control section 21 stops driving the first illumination section 31 ((B)-(3) in FIG. 18) while starting driving control of the second illumination section 32 ((C) in FIG. 18).

At the same time, the control section 21 controls the first light receiving element 101 to stop driving ((D) in FIG. 18) while starting driving control of the second light receiving element 102, to perform signal reading control of the output signal of the second light receiving element 102 ((E) in FIG. 18).

At this time, the driving control of the second illumination section 32 is performed only in a lighting period B previously set ((C) in FIG. 18). During the lighting period B of the second illumination section 32, the first illumination section 31 enters a non-lighting state (a lights-out period A1; (B)-(4) in FIG. 18).

Similarly, the driving control of the second light receiving element 102 is also performed only in a predetermined period previously set (a focusing period in FIG. 18) ((E) in FIG. 18). During the focusing period, the first light receiving element 101 is in a non-driven state.

After the predetermined lighting period B and the predetermined focusing period have elapsed, the control section 21 stops driving the second illumination section 32, and at the same time controls the second light receiving element 102 to stop driving.

Then, the control section 21 waits for the vertical synchronization signal VD again ((A)-(5) in FIG. 18), to perform start of the driving control of the first illumination section 31 ((B) in FIG. 18), and the driving control of the AD conversion section 115 and the driving control of the signal reading section 22 ((D) in FIG. 18).

The driving control of the first illumination section 31 is performed only in the lighting period A previously set ((B) in FIG. 18). Similarly, the driving control of the first light receiving element 101 is also performed only in the image pickup period previously set ((D) in FIG. 18). During the lighting period A of the first illumination section 31, the second illumination section 32 is in the lights-out state (the lights-out period B in FIG. 18).

After the predetermined lighting period A and the predetermined image pickup period have elapsed, the control section 21 stops driving the first illumination section 31 ((B)-(6) in FIG. 18) while controlling the first light receiving element 101 to stop driving ((D) in FIG. 18). After an elapse of a lights-out period A2 previously set ((B)-(7) in FIG. 18), the control section 21 waits for the vertical synchronization signal VD again ((A)-(8) in FIG. 18), to perform start of the driving control of the first illumination section 31 ((B) in FIG. 18), and the driving control of the AD conversion section 115 and the driving control of the signal reading section 22 ((D) in FIG. 18).

Thus, after the driving control of the first light receiving element 101 is repeated a predetermined plurality of times (four times in the function example in FIG. 18), the control section 21 stops driving the first illumination section 31 ((B)-(9) in FIG. 18) while starting the driving control of the second illumination section 32 ((C) in FIG. 18).

At the same time, the control section 21 controls the first light receiving element 101 to stop driving ((D) in FIG. 18) while starting the driving control of the second light receiving element 102, to perform the signal reading control of the output signal of the second light receiving element 102 ((E) in FIG. 18).

After the predetermined lighting period B and the predetermined focusing period have elapsed, the control section 21 stops driving the second illumination section 32, and at the same time controls the second light receiving element 102 to stop driving.

Then, the control section 21 waits for the vertical synchronization signal VD again ((A)-(10) in FIG. 18), to repeat a similar function thereafter.

As described above, according to the above-described one embodiment, the solid state image sensor 11 includes the light receiving sections 100 formed in a two-dimensional array, the light receiving section in one unit being formed such that the microlens 103 provided on the light receiving surface, the first light receiving element 101 for normal image acquisition (the photodiode) configured to receive light incident from an observation object via the microlens 103 to acquire normal image data, and the second light receiving element 102 for range image detection (a TOF range image sensor) provided in a layer below the first light receiving element 101 and configured to receive light incident from the observation object via the microlens 103 and the first light receiving element 101 and acquire information about a distance to the observation object configure a stacked structure.

The configuration enables the solid state image sensor 11 according to the present embodiment to simultaneously acquire normal image data and range image data. Therefore, the observation object can be determined based on the normal image data, and at the same time distance data to the observation object can be acquired.

A light receiving area of the second light receiving element 102 is set larger than a light receiving area of the first light receiving element 101. Thus, a light receiving amount of the second light receiving element 102 configured to receive light, which has been transmitted by the first light receiving element 101, can be ensured. Accordingly, highly precise range image data can be acquired.

The signal reading section 22 configured to read out electric signals respectively obtained by photoelectric conversion by the first light receiving element 101 and the second light receiving element 102 is configured to finish signal reading processing of either one of the first light receiving element 101 and the second light receiving element 102 and then perform signal reading processing of the other of the first light receiving element 101 and the second light receiving element 102.

That is, during a blanking period after the end of signal reading processing of the normal image data by the first light receiving element 101, signal reading processing of the range image data by the second light receiving element 102 is performed. Thus, a driving period for acquiring distance data need not be separately provided, which can contribute to higher speed of processing while contributing to power saving.

Signal reading processing of the first light receiving element 101 or the second light receiving element 102 and illumination control of the illumination unit 30 are configured to be performed in synchronization with the vertical synchronization signal VD. Thus, the signal reading processing and the illumination control can always be performed at accurate timings.

The illumination unit 30 is configured to include the first illumination section 31 corresponding to the first light receiving element 101 and the second illumination section 32 corresponding to the second light receiving element 102. The first illumination section 31 and the second illumination section 32 are configured to respectively emit illumination lights having different wavelength. For example, the first illumination section 31 emits normal light, and the second illumination section 32 emits special light (e.g., fluorescence and infrared light). Thus, the first light receiving element 101 can acquire normal image data while the second light receiving element 102 can simultaneously acquire fluorescence image data, infrared image data, and the like.

At least some of the first light receiving elements 101A are each formed to include the plurality of divided light receiving elements (101Aa, 101Ab, 101Ac, and 101Ad).

Thus, the plurality of divided light receiving elements (101Aa, 101Ab, 101Ac, and 101Ad) in the first light receiving element 101A can respectively acquire image data having different phases and can also generate focus data about focusing.

Therefore, when the focus data acquired by the first light receiving element 101A and the range image data acquired by the second light receiving element 102 are used, a more accurate and high speed focus adjustment operation can be implemented.

Note that the present invention is not limited to the above-described embodiment. It is a matter of course that various modifications and applications can be made without departing from the spirit of the invention. Further, the above-described embodiment includes inventions in various stages, and the various inventions can be extracted by an appropriate combination of a plurality of constituent requirements to be disclosed. Even if some of all constituent requirements illustrated in the above-described one embodiment are deleted, for example, a configuration from which the constituent requirements are deleted can be extracted as the invention when problems to be solved by the invention can be solved and effects of the invention can be obtained. Further, components over different embodiments and modifications may be combined, as needed. The present invention is not restricted by specific embodiments, except as by the appended claims.

The present invention is applicable to various types of electronic devices configured to include a solid state image sensor which performs photoelectric conversion upon receipt of an optical image, e.g., electronic devices for observation such as a telescope, binoculars, a monocle, a microscope, and a sample observation apparatus in addition to electronic devices with an image pickup function such as a digital camera, a video camera, a movie camera, a mobile phone, a smartphone, an electronic notebook, an electronic dictionary, personal digital assistants, a personal computer, a tablet terminal device, a game device, a television receiver, a watch, and a navigation device utilizing GPS (global positioning system).

Further, the present invention is similarly applicable to image pickup observation apparatuses such as a monitoring camera and an in-vehicle camera in addition to observation apparatuses for industrial or medical use such as an endoscope and a microscope.

What is claimed is:
1. An observation apparatus comprising:
an image pickup unit comprising: a solid state image sensor including light receiving sections formed in a two-dimensional array, each of the light receiving sections including a lens provided on a light receiving surface, a first light receiving element configured to receive light incident from an object via the lens; and a second light receiving element provided in a layer below the first light receiving element and configured to receive light incident from the object via the lens and the first light receiving element and acquire information about a distance to the object, the lens, the first light receiving element, and the second light receiving element configuring a stacked structure; and an image pickup optical system configured to form an optical image of an observation object on the light receiving surface in the solid state image sensor;
an illumination unit configured to irradiate the observation object with illumination light;

a display unit configured to display an image of the observation object based on an image signal acquired by the image pickup unit; and a control unit including a control section configured to perform driving control of the image pickup unit, the illumination unit, and the display unit, wherein the illumination unit performs illumination control in synchronization with a vertical synchronization signal, the illumination unit irradiates the first light receiving element and the second light receiving element with illumination lights having different wavelengths, respectively, the first light receiving elements perform output relating to a charge amount corresponding to an incident light amount, at least some of the first light receiving elements each include a plurality of divided light receiving elements, and the plurality of divided light receiving elements in each of the first light receiving elements generate focus data relating to focusing, at least some of the second light receiving elements perform output relating to a flight time of light corresponding to the distance to the object and generate distance data relating to the distance to the object, the illumination unit emits illumination light having a first wavelength in synchronization with the vertical synchronization signal, and the at least some of the second light receiving elements receive reflected light of the illumination light having the first wavelength and perform output relating to a flight time of light corresponding to each of distances to a plurality of objects, and during a period from the emission of the illumination light having the first wavelength by the illumination unit to the output performed by the at least some of the second light receiving elements, the illumination unit emits illumination light having a second wavelength different from the first wavelength in synchronization with the vertical synchronization signal, and the first light receiving elements continuously perform a plurality of times of operation of output relating to a charge amount corresponding to an incident light amount during the emission of the illumination light having the second wavelength.

2. The observation apparatus according to claim 1, further comprising
an analysis section configured to perform data analysis based on an output from the first light receiving element or the second light receiving element,
wherein the analysis section calculates the distance to the object based on the focus data.

3. The observation apparatus according to claim 1, wherein the second light receiving element is divided into two light receiving surfaces.

4. The observation apparatus according to claim 3, wherein each of the two divided light receiving surfaces is arranged such that a long side of each of the light receiving surfaces is parallel to a vertical direction on the light receiving surface.

5. The observation apparatus according to claim 3, wherein each of the two divided light receiving surfaces is arranged such that a long side of each of the light receiving surfaces is parallel to a horizontal direction on the light receiving surface.

6. The observation apparatus according to claim 1, further comprising
a color filter configured to pass only light in a predetermined wavelength region, wherein the color filter is provided between the first light receiving element and the second light receiving element.

7. The observation apparatus according to claim 1, wherein the period of emission of the illumination light having the first wavelength by the illumination unit is repeated between two consecutive periods of emission of the illumination light having the second wavelength by the illumination unit.

8. The observation apparatus according to claim 1, wherein driving control of the first light receiving elements is repeated between two consecutive focusing periods during which driving control of the second light receiving elements is performed.

9. A method for driving an observation apparatus comprising an image pickup section comprising a solid state image sensor including light receiving sections formed in a two-dimensional array, each of the light receiving sections including a lens provided on a light receiving surface, a first light receiving element, and a second light receiving element provided in a layer below the first light receiving element, the lens, the first light receiving element, and the second light receiving element configuring a stacked structure, and an image pickup optical system, the method comprising:

receiving, by the first light receiving element, light incident from an object via the lens;

receiving, by the second light receiving element, light incident from the object via the lens and the first light receiving element and acquiring information about a distance to the object;

forming, by the image pickup optical system, an optical image of an observation object on the light receiving surface in the solid state image sensor;

irradiating, by an illumination unit, the observation object with illumination light;

displaying, by a display unit, an image of the observation object based on an image signal acquired by the image pickup unit;

performing, by a control unit including a control section, driving control of the image pickup unit, the illumination unit, and the display unit;

performing, by the illumination unit, illumination control in synchronization with a vertical synchronization signal;

irradiating, by the illumination unit, the first light receiving element and the second light receiving element with illumination lights having different wavelengths, respectively;

performing, by the first light receiving elements, output relating to a charge amount corresponding to an incident light amount, at least some of the first light receiving elements each include a plurality of divided light receiving elements;

generating, by the plurality of divided light receiving elements in each of the first light receiving elements, focus data relating to focusing;

performing, by at least some of the second light receiving elements, output relating to a flight time of light corresponding to the distance to the object and generating distance data relating to the distance to the object;

emitting, by the illumination unit, illumination light having a first wavelength in synchronization with the vertical synchronization signal;

receiving, by the at least some of the second light receiving elements, reflected light of the illumination light having the first wavelength and performing output relating to a flight time of light corresponding to each of distances to a plurality of objects;

emitting, by the illumination unit, during a period from the emission of the illumination light having the first wavelength by the illumination unit to the output performed by the at least some of the second light receiving elements, illumination light having a second wavelength different from the first wavelength in synchronization with the vertical synchronization signal; and continuously performing, by the first light receiving elements, a plurality of times of operation of output relating to a charge amount corresponding to an incident light amount during the emission of the illumination light having the second wavelength.

10. A non-transitory recording medium for recording a program for driving an observation apparatus comprising an image pickup section comprising a solid state image sensor including light receiving sections formed in a two-dimensional array, each of the light receiving sections including a lens provided on a light receiving surface, a first light receiving element, and a second light receiving element provided in a layer below the first light receiving element, the lens, the first light receiving element, and the second light receiving element configuring a stacked structure, and an image pickup optical system, the recording medium causing a computer to:

receive, by the first light receiving element, light incident from an object via the lens;

receive, by the second light receiving element, light incident from the object via the lens and the first light receiving element and acquire information about a distance to the object;

form, by the image pickup optical system, an optical image of an observation object on the light receiving surface in the solid state image sensor;

irradiate, by an illumination unit, the observation object with illumination light;

display, by a display unit, an image of the observation object based on an image signal acquired by the image pickup unit;

perform, by a control unit including a control section, driving control of the image pickup unit, the illumination unit, and the display unit;

perform, by the illumination unit, illumination control in synchronization with a vertical synchronization signal;

irradiate, by the illumination unit, the first light receiving element and the second light receiving element with illumination lights having different wavelengths, respectively;

perform, by the first light receiving elements, output relating to a charge amount corresponding to an incident light amount, at least some of the first light receiving elements each include a plurality of divided light receiving elements;

generate, by the plurality of divided light receiving elements in each of the first light receiving elements, focus data relating to focusing;

perform, by at least some of the second light receiving elements, output relating to a flight time of light corresponding to the distance to the object and generate distance data relating to the distance to the object;

emit, by the illumination unit, illumination light having a first wavelength in synchronization with the vertical synchronization signal;

receive, by the at least some of the second light receiving elements, reflected light of the illumination light having the first wavelength and perform output relating to a flight time of light corresponding to each of distances to a plurality of objects;

emit, by the illumination unit, during a period from the emission of the illumination light having the first wavelength by the illumination unit to the output performed by the at least some of the second light receiving elements, illumination light having a second wavelength different from the first wavelength in synchronization with the vertical synchronization signal; and continuously perform, by the first light receiving elements, a plurality of times of operation of output relating to a charge amount corresponding to an incident light amount during the emission of the illumination light having the second wavelength.

* * * * *